(12) United States Patent
Cheng et al.

(10) Patent No.: US 11,696,289 B2
(45) Date of Patent: *Jul. 4, 2023

(54) USER EQUIPMENT AND METHOD FOR ACTIVATING PUCCH SPATIAL RELATION

(71) Applicant: FG Innovation Company Limited, Tuen Mun (HK)

(72) Inventors: Chien-Chun Cheng, Taipei (TW); Yu-Hsin Cheng, Taipei (TW); Chie-Ming Chou, Taipei (TW); Hung-Chen Chen, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,296

(22) Filed: Mar. 15, 2021

(65) Prior Publication Data

US 2021/0204277 A1 Jul. 1, 2021

Related U.S. Application Data

(63) Continuation of application No. 16/533,713, filed on Aug. 6, 2019, now Pat. No. 10,986,617.

(60) Provisional application No. 62/715,397, filed on Aug. 7, 2018.

(51) Int. Cl.
  *H04W 72/00* (2023.01)
  *H04W 72/21* (2023.01)
(52) U.S. Cl.
  CPC .................................. *H04W 72/21* (2023.01)

(58) Field of Classification Search
  CPC . H04B 7/086; H04B 7/0408; H04W 72/0413; H04W 72/046; H04W 72/042
  See application file for complete search history.

(56) References Cited

U.S. PATENT DOCUMENTS

| | | | |
|---|---|---|---|
| 10,986,617 B2* | 4/2021 | Cheng | H04W 72/0413 |
| 2019/0141693 A1* | 5/2019 | Guo | H04W 72/042 |
| 2019/0312698 A1* | 10/2019 | Akkarakaran | H04B 7/0695 |
| 2019/0349867 A1* | 11/2019 | MolavianJazi | H04W 52/146 |
| 2019/0357215 A1* | 11/2019 | Zhou | H04L 5/0094 |

(Continued)

OTHER PUBLICATIONS

"New Signal Designs for Enhanced Spatial Modulation"; Cheng et al.; IEEE Transactions on Wireless Communications, vol. 15, No. 11, Nov. 2016 (Year: 2016).*

(Continued)

*Primary Examiner* — Benjamin H Elliott, IV
(74) *Attorney, Agent, or Firm* — ScienBiziP, P.C.

(57) ABSTRACT

A user equipment and a method for activating a physical uplink control channel (PUCCH) spatial relation are provided. The method includes receiving, from a base station (BS), a medium access control (MAC) control element (CE) including a first field and a second field, the first field indicating an identifier (ID) of a specific PUCCH spatial relation to be activated or deactivated, the second field indicating an ID of a specific PUCCH resource; applying the MAC CE to all PUCCH resources in a specific PUCCH group that includes the specific PUCCH resource in a case that the MAC CE is identified by a first LCID; and applying the MAC CE to the specific PUCCH resource in a case that the MAC CE is identified by a second LCID.

20 Claims, 16 Drawing Sheets

(56) References Cited

U.S. PATENT DOCUMENTS

| | | | |
|---|---|---|---|
| 2019/0357260 A1* | 11/2019 | Cirik | H04W 72/04 |
| 2020/0044797 A1* | 2/2020 | Guo | H04B 7/0408 |
| 2020/0053721 A1* | 2/2020 | Cheng | H04W 72/0413 |
| 2020/0119778 A1* | 4/2020 | Grant | H04W 72/0413 |
| 2020/0358577 A1* | 11/2020 | Takeda | H04L 5/0023 |
| 2021/0204277 A1* | 7/2021 | Cheng | H04B 7/0408 |
| 2021/0344386 A1* | 11/2021 | Grant | H04B 7/0695 |

OTHER PUBLICATIONS

Ericsson, Remaining details of beam management, 3GPP TSG RAN WG1 Meeting #92bis, Sanya, China, Apr. 16-20, 2018, R1-1804974, the whole document.

Huawei, HiSilicon, "Introducing new MAC CEs for NR MIMO", R2-1800245, 3GPP TSG-RAN WG2 NR Ad hoc 0118 Vancouver, Canada, Jan. 22-Jan. 26, 2018.

3GPP TS 38.213, "3rd Generation Partnership Project; Technical Specification Group Radio Access Network; NR; Physical layer procedures for control (Release 15)", V15.2.0 (Jun. 2018).

3GPP TS 38.331, "3rd Generation Partnership Project; Technical Specification Group Radio Access Network; NR; Radio Resource Control (RRC) protocol specification (Release 15)", V15.2.1 (Jun. 2018).

3GPP TS 38.321, "3rd Generation Partnership Project; Technical Specification Group Radio Access Network; NR; Medium Access Control (MAC) protocol specification (Release 15)", V15.2.0 (Jun. 2018).

Anonymous: "3rd Generation Partnership Project; Technical Specification Group Radio Access Network; NR; Medium Access Control (MAC) protocol specification (Release 15)", 3GPP TS 38.321 V15.1.0, Mar. 1, 2018 (Mar. 1, 2018).

* cited by examiner

| R | Serving Cell ID | | | | | | BWP ID | Oct 1 |
|---|---|---|---|---|---|---|---|---|
| R | PUCCH Resource ID | | | | | | | Oct 2 |
| $S_7$ | $S_6$ | $S_5$ | $S_4$ | $S_3$ | $S_2$ | $S_1$ | $S_0$ | Oct 3 |

FIG. 5

| Select all groups | Serving Cell ID | | | BWP ID | Oct 1 |
|---|---|---|---|---|---|
| Select all resources | PUCCH Resource ID | | | | Oct 2 |
| R | R | Select no group | PUCCH Resource Group ID | Spatial Relation ID | Oct 3 |

FIG. 6

| Select all resources | Serving Cell ID | | | | BWP ID | Oct 1 |
|---|---|---|---|---|---|---|
| R | PUCCH Resource ID | | | | | Oct 2 |
| R | Group ID #1 | Group ID #2 | Group ID #3 | Group ID #4 | Spatial Relation ID | Oct 3 |

FIG. 7

| F | Serving Cell ID | | | BWP ID | Oct 1 |
|---|---|---|---|---|---|
| R | PUCCH Resource ID | | | | Oct 2 |
| R | Select all resources | Select all groups | PUCCH Resource Group ID | Spatial Relation ID | Oct 3 |

FIG. 8

| | | | | | | | | |
|---|---|---|---|---|---|---|---|---|
| R | | Serving Cell ID | | | | BWP ID | | Oct 1 |
| R | | PUCCH Resource ID | | | | | | Oct 2 |
| R | R | R | Select no group | Select all resources | Select all groups | PUCCH Resource Group ID | | Oct 3 |
| $S'_7$ | $S'_6$ | $S'_5$ | $S'_4$ | $S'_3$ | $S'_2$ | $S'_1$ | $S'_0$ | Oct 4 |

FIG. 13

| | | | | | | | | |
|---|---|---|---|---|---|---|---|---|
| Select all resources | Serving Cell ID | | | | | BWP ID | | Oct 1 |
| R | PUCCH Resource ID | | | | | | | Oct 2 |
| R | R | R | R | Group ID #1 | Group ID #2 | Group ID #3 | Group ID #4 | Oct 3 |
| $S'_7$ | $S'_6$ | $S'_5$ | $S'_4$ | $S'_3$ | $S'_2$ | $S'_1$ | $S'_0$ | Oct 4 |

FIG. 14

| F | Serving Cell ID | | | | | BWP ID | | Oct 1 |
|---|---|---|---|---|---|---|---|---|
| R | PUCCH Resource ID | | | | | | | Oct 2 |
| R | R | R | R | Select all resources | Select all groups | PUCCH Resource Group ID | | Oct 3 |
| $S'_7$ | $S'_6$ | $S'_5$ | $S'_4$ | $S'_3$ | $S'_2$ | $S'_1$ | $S'_0$ | Oct 4 |

FIG. 15

| Select all resources | Serving Cell ID | | | | | BWP ID | | Oct 1 |
|---|---|---|---|---|---|---|---|---|
| F | PUCCH Resource ID | | | | | | | Oct 2 |
| R | R | R | R | Group ID #1 | Group ID #2 | Group ID #3 | Group ID #4 | Oct 3 |
| $S'_7$ | $S'_6$ | $S'_5$ | $S'_4$ | $S'_3$ | $S'_2$ | $S'_1$ | $S'_0$ | Oct 4 |

FIG. 16

| R | Serving Cell ID | | | | | BWP ID | | Oct 1 |
|---|---|---|---|---|---|---|---|---|
| R | R | R | R | R | R | PUCCH Resource Group ID | | Oct 2 |
| $S_7$ | $S_6$ | $S_5$ | $S_4$ | $S_3$ | $S_2$ | $S_1$ | $S_0$ | Oct 3 |

FIG. 23

| R | Serving Cell ID | | | | | BWP ID | | Oct 1 |
|---|---|---|---|---|---|---|---|---|
| R | R | R | R | Group ID #1 | Group ID #2 | Group ID #3 | Group ID #4 | Oct 2 |
| $S_7$ | $S_6$ | $S_5$ | $S_4$ | $S_3$ | $S_2$ | $S_1$ | $S_0$ | Oct 3 |

FIG. 24

USER EQUIPMENT AND METHOD FOR ACTIVATING PUCCH SPATIAL RELATION

CROSS-REFERENCE TO RELATED APPLICATION(S)

This application is a continuation application of U.S. patent application Ser. No. 16/533,713, filed on Aug. 6, 2019, which claims the benefit of and priority to a provisional U.S. Patent Application Ser. No. 62/715,397, filed on Aug. 7, 2018. The contents of all of which are fully incorporated herein by reference.

FIELD

The present disclosure generally relates to wireless communication, and more particularly, to a method for activating a physical uplink control channel (PUCCH) spatial relation in the next generation wireless communication networks.

BACKGROUND

Various efforts have been made to improve different aspects of wireless communications, such as data rate, latency, reliability and mobility, for the next generation (e.g., 5G New Radio (NR)) wireless communication systems. Physical channels between a user equipment (UE) and a base station (e.g., a gNB) may be categorized as data channels and control channels. The control channels may include a Physical Downlink Control Channel (PDCCH) and a Physical Uplink Control Channel (PUCCH). The UE may transmit a PUCCH using a beam with respect to its receiving (RX) beam of a received Synchronization Signal (SS)/Physical Broadcast Channel (PBCH) block (SSB). A radio resource control (RRC) message sent from the base station may include an information element (IE) PUCCH-Spatialrelationinfo, indicating that the UE may transmit the uplink PUCCH using the same beam as it used for receiving the corresponding downlink signal. For example, if the IE PUCCH-Spatialrelationinfo provides a higher layer parameter ssb-Index, the UE may transmit the PUCCH using a same spatial domain filter as for a reception of a SS/PBCH block with an index provided by the parameter ssb-Index.

For the UE, the maximum number of downlink (DL) RX beams (e.g., in the maxNumberRxBeam parameter) may be 8. On the other hand, for DL transmitting (TX) beams of the base station, the maximum number of SSB beams may be 64. In other words, the base station may transmit 64 different TX beams, but the UE may only have 8 different RX beams for reception. The base station may configure multiple PUCCH-SpatialRelationInfo in a list to indicate a PUCCH beam, which may contain multiple ssb-indexes. However, part of these ssb-indexes may be corresponding to the same PUCCH beam because the UE uses the same reception beam for these SS/PBCH blocks. In such a case, when the base station sends a request for a PUCCH beam switch, the UE may continue using the same beam, which may lead to signaling waste. For example, during a procedure for a PUCCH beam indication, the base station may send SSB beams #1, #2 and #3, but the UE may simply use RX beam #1 for reception. As a result, when the base station sends a request for beam switching from ssb-index #1 to ssb-index #2, the UE may continue using the same beam to transmit PUCCH. Thus, there is a need to avoid such signaling waste in the next generation wireless communication networks.

SUMMARY

The present disclosure is directed to a user equipment and a method for activating a PUCCH spatial relation in the next generation wireless communication networks.

According to an aspect of the present disclosure, a UE is provided. The UE includes a processor and a memory coupled to the processor, where the memory stores a computer-executable program that when executed by the processor, causes the processor to receive, from a base station (BS), a medium access control (MAC) control element (CE) including a first field and a second field, the first field indicating an identifier (ID) of a specific PUCCH spatial relation to be activated or deactivated, the second field indicating an ID of a specific PUCCH resource; apply the MAC CE to all PUCCH resources in a specific PUCCH group that includes the specific PUCCH resource in a case that the MAC CE is identified by a first logical channel ID (LCID); and apply the MAC CE to the specific PUCCH resource in a case that the MAC CE is identified by a second LCID.

According to another aspect of the present disclosure, a method for activating a PUCCH spatial relation performed by a UE is provided. The method includes receiving, from a BS, a MAC CE including a first field and a second field, the first field indicating an ID of a specific PUCCH spatial relation to be activated or deactivated, the second field indicating an ID of a specific PUCCH resource; applying the MAC CE to all PUCCH resources in a specific PUCCH group that includes the specific PUCCH resource in a case that the MAC CE is identified by a first LCID; and applying the MAC CE to the specific PUCCH resource in a case that the MAC CE is identified by a second LCID.

BRIEF DESCRIPTION OF THE DRAWINGS

Aspects of the example disclosure are best understood from the following detailed description when read with the accompanying figures. Various features are not drawn to scale, dimensions of various features may be arbitrarily increased or reduced for clarity of discussion.

FIG. 5 shows a MAC CE for activating a PUCCH spatial relation, according to an example implementation of the present application.

FIG. 6 shows a MAC CE having a PUCCH resource group ID, according to an example implementation of the present application.

FIG. 7 shows a MAC CE having a bitmap for indicating a PUCCH resource group ID, according to an example implementation of the present application.

FIG. 8 shows a MAC CE having a field for indicating whether a group-based indication is used, according to an example implementation of the present application.

FIG. 13 shows a MAC CE for activating multiple PUCCH spatial relations, according to an example implementation of the present application.

FIG. 14 shows a MAC CE for activating multiple PUCCH spatial relations, the MAC CE having a bitmap for indicating a PUCCH resource group ID, according to an example implementation of the present application.

FIG. 15 shows a MAC CE for activating multiple PUCCH spatial relations, the MAC CE having a field for indicating whether a group-based indication is used, according to an example implementation of the present application.

FIG. 16 shows a MAC CE for activating multiple PUCCH spatial relations, the MAC CE having a field shown in FIG. 15 and a bitmap shown in FIG. 14, according to an example implementation of the present application.

FIG. 23 shows a MAC CE without a particular PUCCH resource ID, according to an example implementation of the present application.

FIG. 24 shows another format of a MAC CE without a particular PUCCH resource ID, according to an example implementation of the present application.

DETAILED DESCRIPTION

Figure 1:
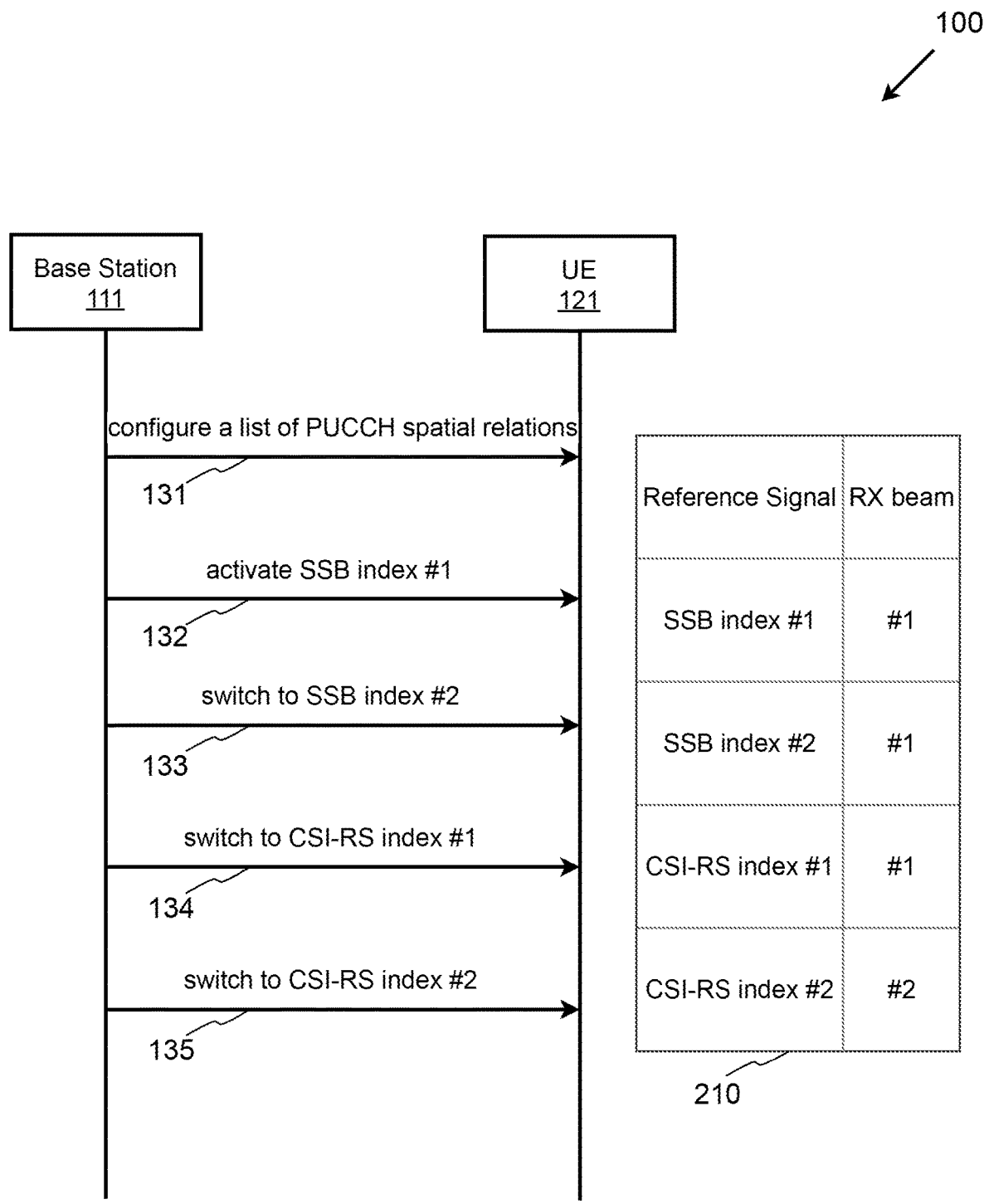
FIG. 1 is a diagram illustrating an example of configuration redundancy when activating a PUCCH spatial relation, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-Advanced Pro system, or a 5G New Radio (NR) Radio Access Network) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a personal digital assistant (PDA) with wireless communication capability. The UE is configured to receive and transmit signals over an air interface to one or more cells in a radio access network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), New Radio (NR, often referred to as 5G), and/or LTE-A Pro. However, the scope of the present application should not be limited to the above mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services or V2X services.

FIG. 1 is a diagram 100 illustrating an example of configuration redundancy when activating a PUCCH spatial relation, according to an example implementation of the present application. In action 131, a base station 111 (e.g., a gNB) may send an RRC configuration message to a UE 121 to configure a list of PUCCH spatial relations, which may configure one or more spatial relations between the PUCCH and downlink signals such as a Channel State Information Reference Signal (CSI-RS) or a Synchronization Signal Block (SSB). For example, if a spatial relation between the PUCCH and SSB is configured, the UE 121 may transmit the PUCCH using the same beam as it has used for receiving the SSB. In one implementation, the base station 111 may configure multiple spatial relations to the UE 121, and the base station 111 may use a MAC CE to indicate which one of the spatial relations to be activated. According to the example shown in FIG. 1, the list of PUCCH spatial relations configured in action 131 may include reference signals SSB index #1, SSB index #2, CSI-RS index #1, and CSI-RS index #2, as shown in the table 210.

There may be a beam relation between a reference signal and an RX beam of the UE 121. For example, as shown in FIG. 1, the table 210 shows the beam relations between the RX beams and the reference signals that are configured in the list of spatial relations in action 131. Because the base station 111 has no information about the RX beams at the UE 121, there may be configuration redundancy in the configured list. As shown in the table 210, in action 131, the list PUCCH-SpatialRelationInfo is configured for four different TX beams, but at the UE 121, only two RX beams are used for reception. When the base station 111 has no information of the RX beams, this list may have up to 50% of redundancy. Moreover, when the base station 111 needs a PUCCH beam switch, the base station 111 may try blindly until it succeeds. For example, in action 132, the base station 111 may use a MAC CE to activate a PUCCH spatial relation that has a reference signal SSB index #1. In action 133, the base station 111 may try to switch to another PUCCH spatial relation that has a reference signal SSB index #2. However, the UE 121 uses the same RX beam #1 for receiving SSB index #1 and SSB index #2, and therefore the PUCCH beam does not switch. In action 134, the base station 111 may again try to switch to another PUCCH spatial relation that has a reference signal CSI-RS index #1. The PUCCH beam still does not switch because the RX beam for CSI-RS index #1 is the same as for SSB index #2. In action 135, the base station 111 may try to switch to another PUCCH spatial relation that has a reference signal CSI-RS index #2. Only in this scenario, the UE 121 may switch to RX beam #2 for transmitting the PUCCH. As illustrated in this example, there may exist configuration redundancy in action 133 and action 134.

Figure 2:
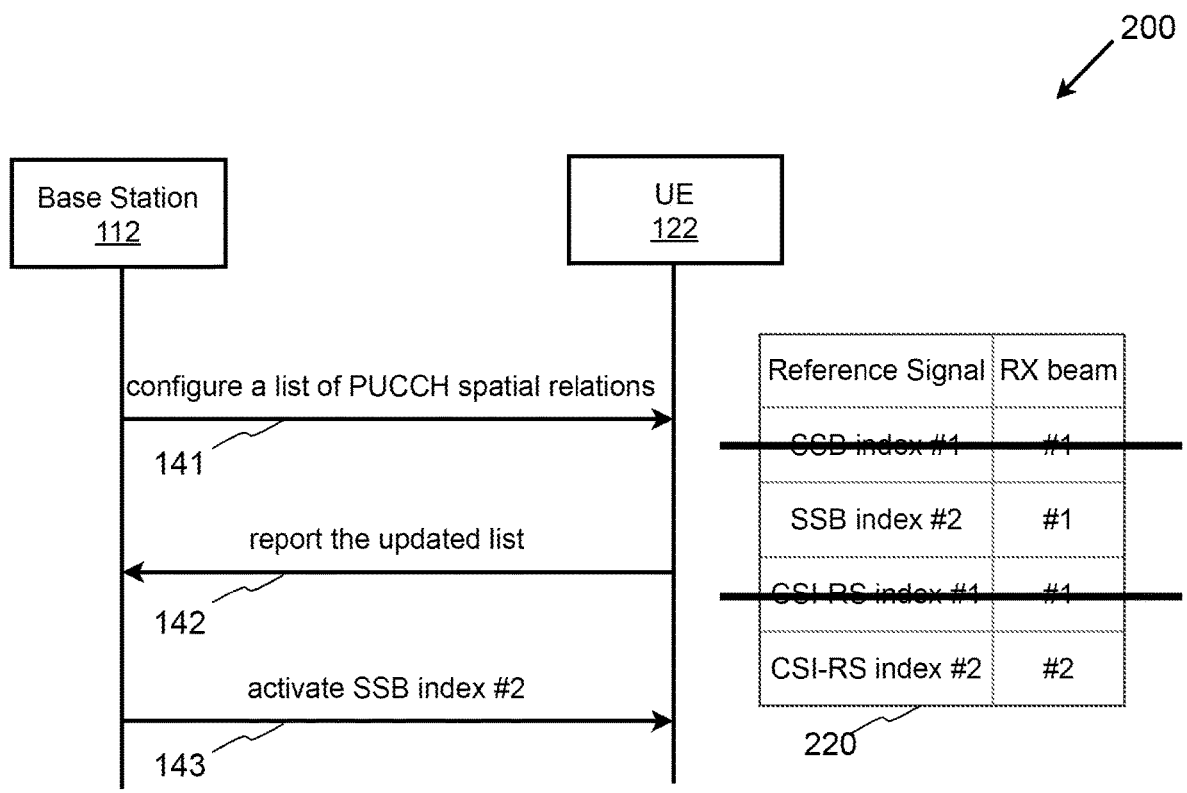
FIG. 2 is a diagram illustrating an example of a UE reporting an updated list to avoid configuration redundancy, according to an example implementation of the present application.

In one implementation, the UE may report an updated spatial correlation table (e.g., to the base station). FIG. 2 is a diagram 200 illustrating an example of a UE reporting an updated list to avoid configuration redundancy, according to an example implementation of the present application. In action 141, a base station 112 (e.g., a gNB) may transmit an RRC message to configure a list of PUCCH-SpatialRelationInfo. A UE 122 may obtain an updated list of multiple configured PUCCH spatial relations by merging the PUCCH spatial relations that are corresponding to the same receiving beam(s). For example, as shown in the table 220, three reference signals SSB index #1, SSB index #2, CSI-RS index #1 are corresponding to the same receiving beam #1, and thus the UE 122 may merge these PUCCH spatial relations into a single entry in the updated list. In action 142, the UE 122 may transmit the updated list to the base station 112. Based on the received updated list, the base station 112 may have information of the RX beams at the UE 122. As such, in action 143, the base station 112 may use a MAC CE to make an informed activation by activating SSB index #2.

In one implementation, the updated list may be reported via RRC signaling. To benefit from signaling when modifying a list for less redundancy, an information element (IE) wish-list may be used. In this implementation, instead of two lists (e.g., including add/mod-list and release-list) for PUCCH-SpatialRelationInfo, three lists may be provided for the PUCCH beam indication. This wish-list may be used to convey only the identities (IDs) of the list elements that are preferred to be released from the list. Part of an example RRC message may be provided as below. Abstract Syntax Notation One (ASN.1) may be used to describe the data structure of various implementations of a message in the present application.

```
AnExampleIE ::= SEQUENCE {
  elementsToAddModList SEQUENCE (SIZE (1..maxNrofElements))
OF Element
                                OPTIONAL, -- Need N
  elementsToReleaseList SEQUENCE (SIZE (1..maxNrofElements))
OF ElementId
                                OPTIONAL, -- Need N
  elementsForWishList SEQUENCE (SIZE (1..maxNrofElements))
OF ElementId
                                OPTIONAL, -- Need U
  ...
}
Element ::=SEQUENCE {
  elementId          ElementId,
  aField             INTEGER (0..16777215),
  anotherField       OCTET STRING,
  ...
}
ElementId ::=         INTEGER (0..maxNrofElements-1)
maxNrofElements       INTEGER ::= 50
maxNrofElements-1     INTEGER ::= 49
```

In one implementation, the elements of the wish-list may contain an identity. The wish-list may be flagged as "Need U," which reflects that the UE 122 may need to update the list and report it to the base station 112. The UE 122 may report the list via a Physical Uplink Shared Channel (PUSCH). In one implementation, the following procedure may apply:
The UE may:
  if the current UE configuration includes an Element with
    the given ElementId:
    add ElementID in the elementsForWishList;
    report elementsForWishList to the base station via
      PUSCH.

In one implementation, the updated list may be reported via CSI reporting. To remove redundancy in a list of PUCCH-SpatialRelationInfo, the number of required bits may be calculated according to the maximum number of spatial relations in a configured list maxNrofSpatialRelationInfos. In one implementation, the maximum number (e.g., in the maxNrofSpatialRelationInfos parameter) may be 8, which means 3 bits are needed for the UE to report redundancy. As a result, such a small payload may be carried by the CSI reporting framework. The UE may initiate a procedure to transfer indication of redundancy in a configured list from the UE to the network. In one implementation, the UE may initiate this procedure only after successful security activation. In one implementation, the following procedure may apply:

```
For list-redundancy information to be included in a measurement report,
the UE may:
  if reportType is set to eventTriggered,
    set WishList-Index to include SSB indexes or CSI-RS indexes in the
    configured list of PUCCH-SpatialRelationInfo as follows:
      if list-redundancy information to be included is based on the
      CSI-RS indexes in the list,
        include within WishList-Index the index,
      else if list-redundancy information to be included is based on the
      SSB indexes in the list,
        include within WishList-Index the index if no more CSI-RS
        index is in list-redundancy information.
```

In one implementation, an entry wishList-Index in reportQuantity may be used in CSI-ReportConfig. An example CSI report configuration may be provided as below. The maximum number of wishList-Index may be set to be a parameter maxNrofSpatialRelationInfos, which is a positive integer.

```
-- TAG-CSI-REPORTCONFIG-START
CSI-ReportConfig ::=        SEQUENCE {
  reportConfigId            CSI-ReportConfigId,
  ...
  reportQuantity            CHOICE {
    none                    NULL,
    cri-RI-PMI-CQI          NULL,
    cri-RI-i1               NULL,
    cri-RI-i1-CQI           SEQUENCE{
      pdsch-BundleSizeForCSI  ENUMERATED {n2, n4}   OPTIONAL
    },
    cri-RI-CQI              NULL,
    cri-RSRP                NULL,
    ssb-Index-RSRP          NULL,
    cri-RI-LI-PMI-CQI       NULL,
    wishList-Index          NULL
  }
```

In one implementation, after a list of PUCCH-SpatialRelationInfo is configured, the UE may update the whole list and report the updated list to the base station. The base station may use a MAC CE to activate one element of the list based on the updated list. The UE may report to the base station based on the received list of PUCCH-SpatialRelationInfo. In one implementation, the UE may only report the indexes in the configured PUCCH-SpatialRelationInfo list based on its own preference. The UE may only suggest to the network (NW) and the NW may compare the report with the previous configuration. In one implementation, the NW may use the IEs elementsToAddModList and elementsToReleaseList to signal and update the PUCCH spatial configuration to the UE. Meanwhile, the UE may use the same IEs to report the PUCCH spatial configuration to the NW for conveying its preference on the PUCCH transmitting beam settings.

Figure 3:
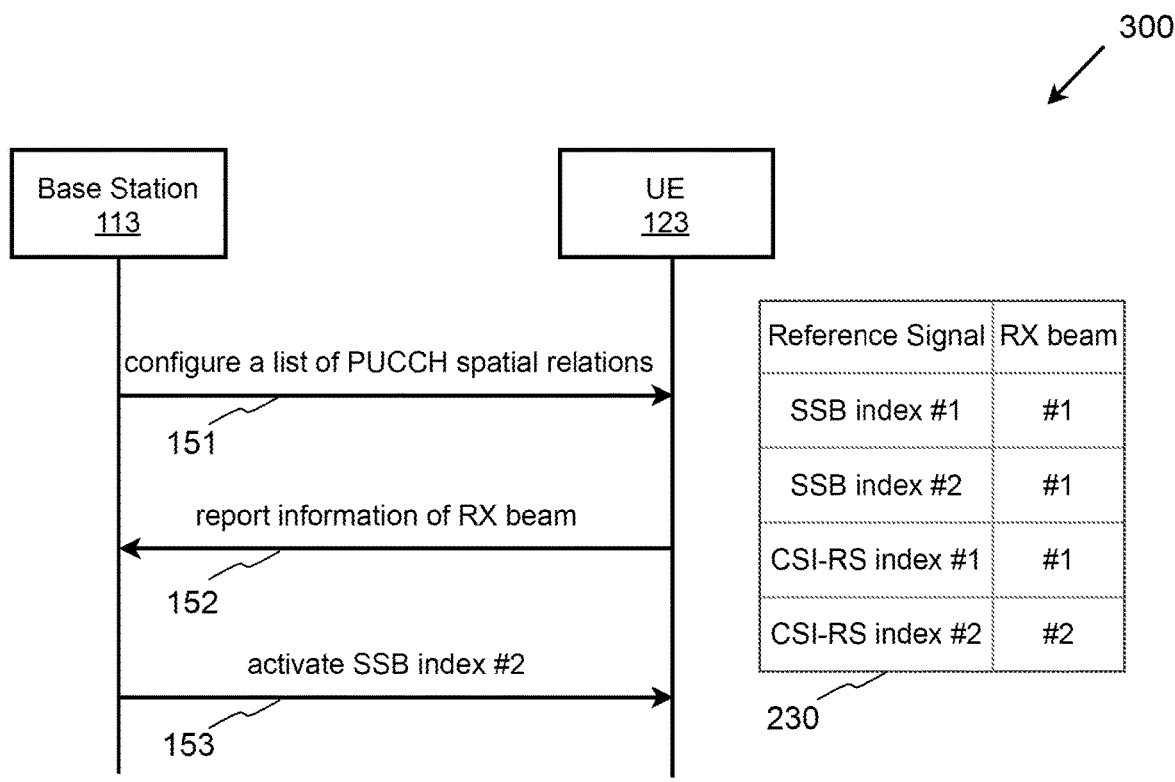
FIG. 3 is a diagram illustrating an example of a UE reporting information of receiving beams to avoid configuration redundancy, according to an example implementation of the present application.

In one implementation, the UE may report its corresponding RX beams to the base station. FIG. 3 is a diagram 300 illustrating an example of a UE reporting information of receiving beams to avoid configuration redundancy, according to an example implementation of the present application. In action 151, a base station 113 may transmit an RRC message to configure a list of PUCCH-SpatialRelationInfo. In action 152, a UE 123 may transmit information of a receiving beam that is corresponding to each of the configured PUCCH spatial relations. In one implementation, the UE 123 may report its corresponding RX beams with respect to the configured SSB index and/or CSI-RS index. For example, the UE 123 may report to the base station 113 that reference signals SSB index #1, SSB index #2, and CSI-RS index #1 are corresponding to the same receiving beam #1, as shown in table 230. Based on the received information in action 152, the base station 113 may have information of the RX beam(s) at the UE 123. As such, in action 153, the base station 113 may use a MAC CE to activate one element in the configured list of PUCCH-SpatialRelationInfo. For example, the base station 113 may activate SSB index #2.

The UE 123 may report to the base station 113 based on the received list of PUCCH-SpatialRelationInfo. In one implementation, the UE 123 may only report the indexes in the configured PUCCH-SpatialRelationInfo list based on the corresponding RX beams. The UE may only suggest to the NW and the NW may compare the report with the previous configuration. In one implementation, the NW may use the IEs elementsToAddModList and elementsToReleaseList to signal and update the PUCCH spatial configuration to the UE. Meanwhile, the UE may use the same IEs to report the corresponding RX beams to the NW.

In one implementation, rather than reporting based on RRC signaling, the UE 123 may feedback its corresponding RX beams with respect to a list of PUCCH-SpatialRelationInfo via a CSI reporting framework. An IE reportQuantity in CSI-ReportConfig may be configured to choose the "corresponding-RX-beams" that provides RX beam information with respect to the SSB index and/or CSI-RS index. In one implementation, when the UE 123 is configured by the "corresponding-RX-beams," the UE 123 may report its RX beams related to the SSB indexes and CSI-RS indexes via the Uplink Control Information (UCI) bits. For example, the PUCCH and/or PUSCH may carry the UCI from the UE 123 to the base station 113. There may be five PUCCH formats, depending on the duration of the PUCCH and the UCI payload size.

In one implementation, the maximum number of SSB index and CSI-RS index that can be configured in a list of PUCCH-SpatialRelationInfo may be limited by an IE maxNrofssbCsiRS. Possible values for the IE maxNrofssbCsiRS may be 1, 2, 3, . . . , maxNrofSpatialRelationInfos, where maxNrofSpatialRelationInfos denotes the maximum number of PUCCH-SpatialRelationInfo.

In one implementation, the base station may calculate the chordal distance to measure beam directions among the configured SSB index and CSI-RS index. The base station may avoid using indexes with similar beam directions. In one implementation, the following procedure may apply:
1. Set a reference SSB index or CSI-RS index as a reference for a beam direction.
2. Calculate chordal distances between the reference and a candidate that may be configured in a list.
3. If the calculated distance is smaller than a threshold, this candidate may be removed from the list. Otherwise, it is a valid candidate.
4. The threshold in step 3 may be reported from the UE based on its RX beam settings.
5. The chordal distance between two precoding filters $W_k$, $W_l$ may be calculated by a formula: $d(W_k, W_l) = |W_k W_k^H - W_l W_l^H|/\sqrt{2}$, where $W_k^H$ is a conjugate transpose of $W_k$.

In one implementation, the base station may indicate a spatial domain filter to the UE. A PUCCH beam may be indicated directly if UL TX channels are known at the base station. In one implementation, UL resources may be used by the base station to measure CSI, which may include a UL spatial domain filter indicator (e.g., UL-SDF-Index). An example data structure of the IE PUCCH-SpatialRelationInfo that supports UL-SDF for PUCCH beam indication may be provided as below.

```
PUCCH-SpatialRelationInfo ::=     SEQUENCE {
  pucch-SpatialRelationInfoId       PUCCH-SpatialRelationInfoId,
  ...
  referencesignal                   CHOICE {
    UL-SDF                          UL-SDF-Id,
    ssb-Index                       SSB-Index,
    csi-RS-Index                    NZP-CSI-RS-ResourceId,
    srs                             SEQUENCE{
      resource                      SRS-ResourceId,
      uplinkBWP                     BWP-Id
    }
  }
),
...
```

For UL-SDF measurement, the base station may measure Sounding Reference Signal (SRS) resources. For UL-SDF-Id computation, the UL-SDF-Id may be a k-bit value, where k may be in the range of k=1, 2, 3, according to the UE's capability on the maximum number of RX beams. The base station may calculate the UL-SDF-Id value with the UL-SDF measurement and a series of specified codebooks. The codebooks for UL-SDF may be based on a reference of a CSI framework, which may include Type I Single-Panel Codebook, Type I Multi-Panel Codebook, Type II Codebook, and Type II Port Selection Codebook. The codebook sizes and the number of layers, however, may be limited based on the UE's capability on the number of UL TX beams.

In one implementation, the network may activate and deactivate a spatial relation for a PUCCH resource of a serving cell by sending a PUCCH spatial relation Activation/Deactivation MAC CE. A UE may be configured with one or more PUCCH resources. In one implementation, the UE may also be configured with one or more sets (or groups) of PUCCH resources by a higher layer parameter, such as the PUCCH-ResourceSet parameter. It should be noted that the terms "set" and "group" may be used interchangeably in the following description. Each set of PUCCH resources may include multiple PUCCH resources. A PUCCH resource set may be associated with a PUCCH resource set index, and may be associated with multiple PUCCH resource indexes used in the PUCCH resource set.

In one implementation, a maximum number of PUCCH resources, a maximum number of PUCCH resource sets, and a maximum number of PUCCH resources in a PUCCH resource set may be provided by higher layer parameters. In one implementation, the maximum number of PUCCH resources is 128. In one implementation, the maximum number of PUCCH resource sets is 4. In one implementation, the maximum number of PUCCH resources in a PUCCH resource set is 32, and the maximum number of PUCCH resources in another PUCCH resource set is 8.

Figure 4:
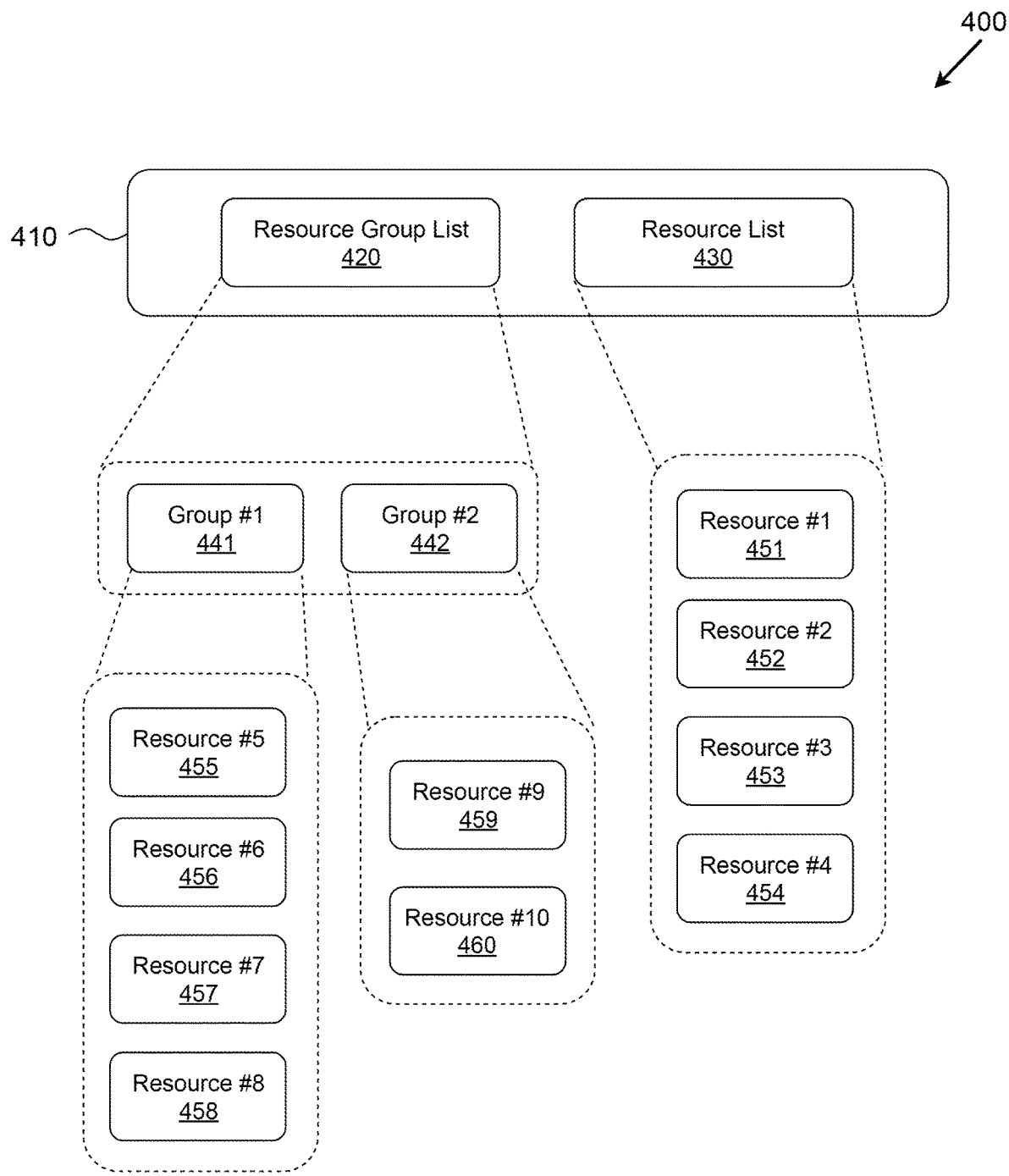
FIG. 4 is a diagram illustrating an example of a PUCCH configuration, according to an example implementation of the present application.

FIG. 4 is a diagram 400 illustrating an example of a PUCCH configuration, according to an example implementation of the present application. The PUCCH configuration 410 may include a resource group list 420 and a resource list 430. The resource list 430 may include a PUCCH resource #1 451, a PUCCH resource #2 452, a PUCCH resource #3 453, and a PUCCH resource #4 454. The index (e.g., #1, #2, #3, #4) of a PUCCH resource may also be referred as a resource ID. The resource group list 420 may include a resource group #1 441 and a resource group #2 442. The index of a resource group may also be referred to as a resource group ID. The resource group #1 441 may include a PUCCH resource #5 455, a PUCCH resource #6 456, a PUCCH resource #7 457, and a PUCCH resource #8 458. The resource group #2 442 may include a PUCCH resource #9 459, and a PUCCH resource #10 460. In this example, a total often PUCCH resources are configured to the UE.

FIG. 5 shows a MAC CE 500 for activating a PUCCH spatial relation, according to an example implementation of the present application. In one implementation, the MAC CE 500 may include three octets (e.g., Oct1, Oct2, Oct3), with each octet having 8 bits. The MAC CE 500 may include a serving cell ID (e.g., 5 bits), a bandwidth part (BWP) ID (e.g., 2 bits), and a PUCCH resource ID (e.g., 7 bits). The serving cell ID may indicate the identity of the serving cell to which the MAC CE 500 applies. The BWP ID may indicate an uplink bandwidth part to which the MAC CE 500 applies. Based on the example shown in FIG. 4, the PUCCH resource ID may indicate one of the ten configured PUCCH resources in FIG. 4.

The MAC CE 500 may use one octet (e.g., Oct3) for activating and deactivating a single spatial relation for a PUCCH resource that is indicated by the PUCCH resource ID. Each of these activation bits $S_0, S_1, \ldots, S_7$ may be corresponding to one spatial relation configured to the UE. The MAC CE 500 may be used to select one element from a configured list of the PUCCH spatial relations. For example, one of the activation bits $S_0, S_1, \ldots, S_7$ may be set to 1, and the other bits may be set to 0. For example, $\{S_0, S_1, \ldots, S_7\}=\{01000000\}$ may indicate that the second PUCCH spatial relation in the configured list is activated. In one implementation, only one of these activation bits $S_0, S_1, \ldots, S_7$ may be set to 1.

The MAC CE 500 may include one or more reserved bits. It should be noted that in the figures of the present application, a field "R" in a MAC CE may represent a reserved bit.

In the MAC CE 500, eight bits (e.g., a bitmap format) may be used to represent eight spatial relations in the configured list. In one implementation, these eight bits may be replaced by a spatial relation ID that has three bits (e.g., a binary representation). For example, a spatial relation ID {001} may represent the first PUCCH spatial relation in the list, a spatial relation ID {010} may represent the second PUCCH spatial relation in the list, and so on.

In one implementation, a MAC CE for activating a PUCCH spatial relation may include a first field and a second field. The first field may indicate at least one of the configured PUCCH spatial relations to be activated. The second field may indicate multiple PUCCH resources corresponding to the at least one PUCCH spatial relation indicated by the first field. Accordingly, a single MAC CE may activate a PUCCH spatial relation for more than one PUCCH resources, and thus the MAC CE signaling of the spatial relation activation may be reduced. Several implementations of a MAC CE for activating at least one PUCCH spatial relation are provided in the following description. It should be noted that the first field (for indicating at least one PUCCH spatial relation) and the second field (for indicating multiple PUCCH resources) mentioned herein may locate differently in the data structure in different implementations.

FIG. 6 shows a MAC CE 600 having a PUCCH resource group ID, according to an example implementation of the present application. The MAC CE 600 may include the following fields: a PUCCH resource group ID, a select all groups field, a select all resources field, a select no group field, and a spatial relation ID. In this implementation, the first field (for indicating at least one PUCCH spatial relation) may include at least the field "spatial relation ID," and the second field (for indicating multiple PUCCH resources) may include at least the field "PUCCH resource group ID."

The field "PUCCH resource group ID" may be a group identity for a group of PUCCH resources. Based on the example shown in FIG. 4, the field "PUCCH resource group ID" may indicate one of the two configured PUCCH resource groups 441 and 442 in FIG. 4. The length of the field "PUCCH resource group ID" may be 2 bits.

The field "select all groups" may indicate whether the MAC CE 600 is used to select all resource groups in a configured PUCCH resource group list. The length of this field may be 1 bit. For example, when this field is set to 1, the MAC CE 600 may be used to select all resource groups 441 and 442 in the resource group list 420 shown in FIG. 4. In one implementation, when this field is set to 1, a UE may ignore the content in the fields "PUCCH resource group ID" and "PUCCH resource ID."

The field "select all resources" may indicate whether the MAC CE 600 is used to select all resources in a configured PUCCH resource list. This field may indicate whether the PUCCH spatial relation indicated by the field "spatial relation ID" is activated for all PUCCH resources configured by the base station. The length of this field may be 1 bit. For example, when this field is set to 1, the MAC CE 600 may be used to select all resources 451-460 in the PUCCH configuration 410 shown in FIG. 4. In one implementation, when this field is set to 1, a UE may ignore the content in the fields "PUCCH resource group ID" and "PUCCH resource ID."

The field "select no group" may indicate whether the MAC CE 600 is used to select no group in a configured PUCCH resource list. The length of this field may be 1 bit. For example, when this field is set to 1, a UE may ignore the content in the field "PUCCH resource group ID."

The field "spatial relation ID" may contain an identifier for a PUCCH spatial relation identified by the IE pucch-SpatialRelationInfold. In one implementation, the field "spatial relation ID" may be an identity of one of the configured PUCCH spatial relations. The length of this field may be 3 bits, for indicating 8 possible PUCCH spatial relations.

In one implementation, the PUCCH resource group ID (e.g., 2 bits) in FIG. 6 may be replaced by a bitmap (e.g., 4 bits). FIG. 7 shows a MAC CE 700 having a bitmap for indicating a PUCCH resource group ID, according to an example implementation of the present application. The MAC CE 700 may include the fields Group ID #i, where i is 1, 2, 3, 4. In this implementation, the second field (for indicating multiple PUCCH resources) may include at least the fields "Group ID #1" to "Group ID #4."

In one implementation, the field "Group ID #i" may be set to 1 to indicate that a PUCCH resource group with ID #i is selected. The fields "Group ID #1" to "Group ID #4" may constitute a bitmap corresponding to multiple groups of PUCCH resources. The number of bits that are set to 1 in the fields "Group ID #1" to "Group ID #4" may be one or more than one. In one implementation, the fields "Group ID #1" to "Group ID #4" may indicate at least two of the configured PUCCH resource groups. For example, based on the example shown in FIG. 4, there may be two resource groups 441 and 442. The fields "Group ID #1" and "Group ID #2" may be both set to 1, such that the MAC CE 700 may be used to activate a PUCCH spatial relation for both of the resource group #1 441 and the resource group #2 442.

It should be noted that fields having the same name among figures may have similar functions, and thus related description will not be repeated.

FIG. 8 shows a MAC CE 800 having a field for indicating whether a group-based indication is used, according to an example implementation of the present application. In this implementation, the first field (for indicating at least one PUCCH spatial relation) may include at least the field "spatial relation ID," and the second field (for indicating multiple PUCCH resources) may include at least the field "PUCCH resource group ID."

The MAC CE 800 may include a field "F," which may indicate that the PUCCH spatial relation (e.g., indicated by the field "spatial relation ID") is activated whether for the single PUCCH resource indicated by the field "PUCCH resource ID," or multiple PUCCH resources indicated by the field "PUCCH resource group ID." In one implementation, the field "F" may indicate whether the MAC CE 800 is used to indicate a PUCCH resource group or a PUCCH resource. For example, the field "F" may be set to 1 to represent group-based indication, and may be set to 0 to represent resource-based indication. In one implementation, a UE may ignore the fields "PUCCH resource ID" and "select all resources" when the field "F" is set to 1. In one implementation, the UE may ignore the fields "PUCCH resource group ID" and "select all groups" when the field "F" is set to 0.

Figure 9:
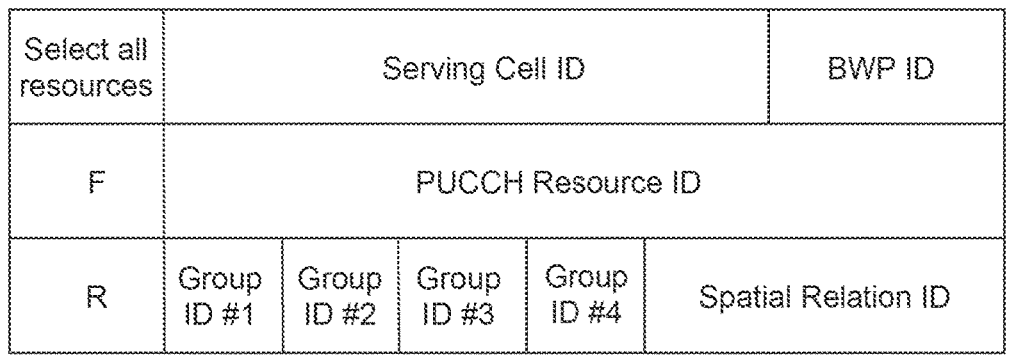
FIG. 9 shows a MAC CE having a field shown in FIG. 8 and a bitmap shown in FIG. 7, according to an example implementation of the present application.

In one implementation, the PUCCH resource group ID (e.g., 2 bits) in FIG. 8 may be replaced by a bitmap (e.g., 4 bits). FIG. 9 shows a MAC CE 900 having a field "F" shown in FIG. 8 and a bitmap shown in FIG. 7, according to an example implementation of the present application. In this implementation, the second field (for indicating multiple PUCCH resources) may include at least the fields "Group ID #1" to "Group ID #4."

In one implementation, the MAC CE for activating a PUCCH spatial relation may be identified by a MAC protocol data unit (PDU) subheader with a logical channel ID (LCID) value. In one implementation, an additional LCID value may be introduced to differentiate between a group-based indication and a resource-based indication. In one implementation, a MAC CE with resource-based indication may be referred to as a MAC CE of TYPE-1, and a MAC CE with group-based indication may be referred to as a MAC CE of TYPE-2. Table 1 below shows an example of LCID values for the downlink shared channel (DL-SCH). Based on the LCID field in the MAC subheader, a UE may recognize whether the MAC CE for the PUCCH spatial relation activation/deactivation is TYPE-1 or TYPE-2.

TABLE 1

| | LCID for DL-SCH |
|---|---|
| Index | LCID values |
| 101110 | PUCCH spatial relation activation/deactivation TYPE-1 |
| 110001 | PUCCH spatial relation activation/deactivation TYPE-2 |

Figure 10:
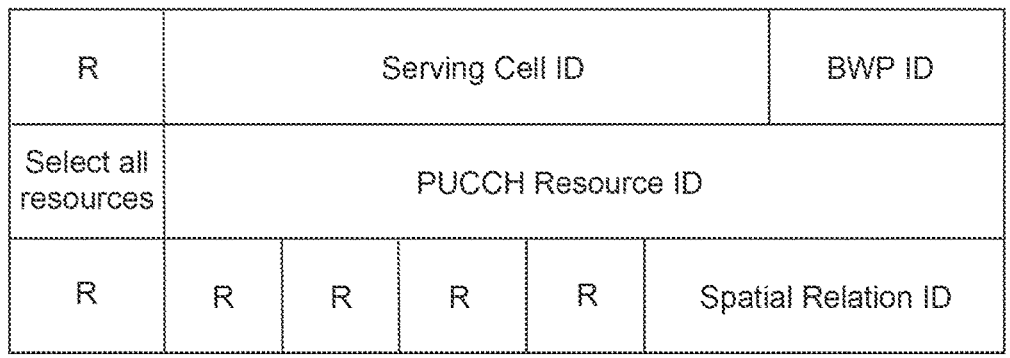
FIG. 10 shows a MAC CE of TYPE-1 for activating a PUCCH spatial relation, according to an example implementation of the present application.

FIG. 10 shows a MAC CE 1000 of TYPE-1 for activating a PUCCH spatial relation, according to an example implementation of the present application. In this implementation, the first field (for indicating at least one PUCCH spatial relation) may include at least the field "spatial relation ID."

Figure 11:
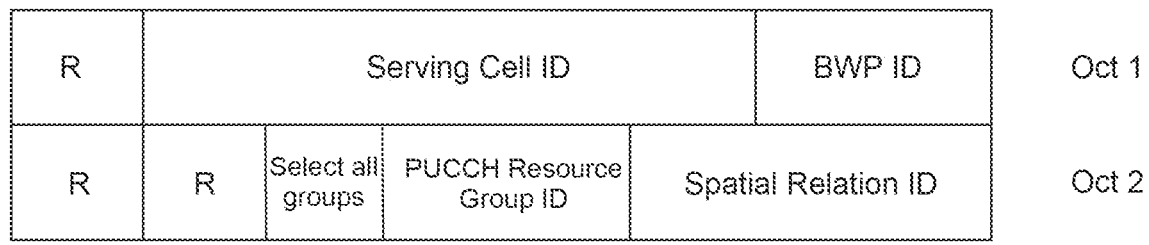
FIG. 11 shows a MAC CE of TYPE-2 for activating a PUCCH spatial relation, according to an example implementation of the present application.

FIG. 11 shows a MAC CE 1100 of TYPE-2 for activating a PUCCH spatial relation, according to an example implementation of the present application. In this implementation, the first field (for indicating at least one PUCCH spatial relation) may include at least the field "spatial relation ID," and the second field (for indicating multiple PUCCH resources) may include at least the field "PUCCH resource group ID."

Figure 12:
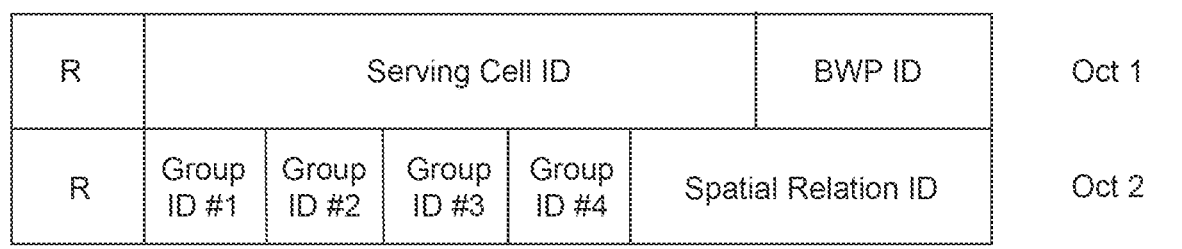
FIG. 12 shows another format of a MAC CE of TYPE-2 for activating a PUCCH spatial relation, according to an example implementation of the present application.

In one implementation, the PUCCH resource group ID (e.g., 2 bits) in FIG. 11 may be replaced by a bitmap (e.g., 4 bits). FIG. 12 shows another format of a MAC CE 1200 of TYPE-2 for activating a PUCCH spatial relation, according to an example implementation of the present application. In this implementation, the second field (for indicating multiple PUCCH resources) may include at least the fields "Group ID #1" to "Group ID #4."

In one implementation, multiple PUCCH beams operation may be supported. FIG. 13 shows a MAC CE 1300 for activating multiple PUCCH spatial relations, according to an example implementation of the present application. The MAC CE 1300 may include four octets, with one of the octets (e.g., Oct 4) representing the spatial relation activation bits $S'_0, S'_1, \ldots, S'_7$. The MAC CE 1300 may be used to select one or more elements from a configured list of PUCCH spatial relations. For example, one or more of the activation bits $S'_0, S'_1, \ldots, S'_7$ may be set to 1, and the other bits may be set to 0. For example, $\{S'_0, S'_1, \ldots, S'_7\} = \{10100000\}$ may indicate that the first and the third PUCCH spatial relations in the configured list are activated. In this implementation, the first field (for indicating at least one PUCCH spatial relation) may include at least the fields $S'_0, S'_1, \ldots, S'_7$, and the second field (for indicating multiple PUCCH resources) may include at least the field "PUCCH resource group ID." The first field may be a bitmap corresponding to the configured PUCCH spatial relations. In one implementation, the bitmap (e.g., $S'_0, S'_1, \ldots, S'_7$) may indicate at least two of the configured PUCCH spatial relations.

In one implementation, if there is a PUCCH Spatial Relation Info with PUCCH-SpatialRelationInfoId i (e.g., i is an integer ranging from 0 to 7) configured for the uplink bandwidth part indicated by the field "BWP ID," the field "$S'_i$," may indicate an activation status of the PUCCH Spatial Relation Info with PUCCH-SpatialRelationInfoId i. Otherwise, a MAC entity in the UE may ignore this field "$S'_i$." In one implementation, the field "$S'_i$," may be set to 1 to indicate that the PUCCH Spatial Relation Info with PUCCH-SpatialRelationInfoId i is activated. The field "$S'_i$," may be set to 0 to indicate that the PUCCH Spatial Relation Info with PUCCH-SpatialRelationInfoId i is deactivated. In one implementation, a single or multiple PUCCH spatial relations may be activated for a PUCCH resource at the same time.

In one implementation, the PUCCH resource group ID (e.g., 2 bits) in FIG. 13 may be replaced by a bitmap (e.g., 4 bits). FIG. 14 shows a MAC CE 1400 for activating multiple PUCCH spatial relations, the MAC CE having a bitmap for indicating a PUCCH resource group ID, according to an example implementation of the present application. In this implementation, the second field (for indicating multiple PUCCH resources) may include at least the fields "Group ID #1" to "Group ID #4."

FIG. 15 shows a MAC CE 1500 for activating multiple PUCCH spatial relations, the MAC CE having a field for indicating whether a group-based indication is used, according to an example implementation of the present application. In this implementation, the first field (for indicating at least one PUCCH spatial relation) may include at least the fields $S'_0, S'_1, \ldots, S'_7$, and the second field (for indicating multiple PUCCH resources) may include at least the field "PUCCH resource group ID." The MAC CE 1500 may include a field "F," which may indicate that the PUCCH spatial relation (e.g., indicated by the fields $S'_0, S'_1, \ldots, S'_7$) is activated whether for the single PUCCH resource indicated by the field "PUCCH resource ID," or multiple PUCCH resources indicated by the field "PUCCH resource group ID."

In one implementation, the PUCCH resource group ID (e.g., 2 bits) in FIG. 15 may be replaced by a bitmap (e.g., 4 bits). FIG. 16 shows a MAC CE 1600 for activating multiple PUCCH spatial relations, the MAC CE having a field shown in FIG. 15 and a bitmap shown in FIG. 14, according to an example implementation of the present application. In this implementation, the second field (for indicating multiple PUCCH resources) may include at least the fields "Group ID #1" to "Group ID #4."

In one implementation, an additional LCID value may be introduced to differentiate between a group-based indication and a resource-based indication. In one implementation, a MAC CE with resource-based indication may be referred to as a MAC CE of TYPE-1, and a MAC CE with group-based indication may be referred to as a MAC CE of TYPE-2. Based on the LCID field in the MAC subheader, a UE may recognize whether the MAC CE for the PUCCH spatial relation activation/deactivation is TYPE-1 or TYPE-2.

Figure 17:
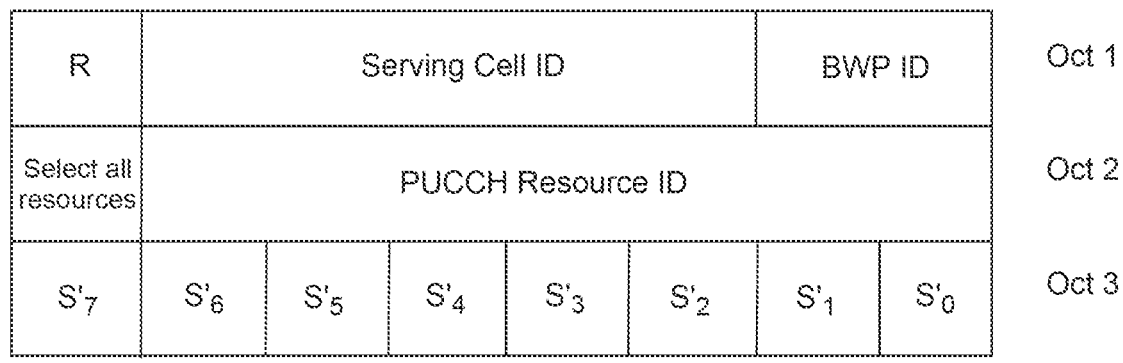
FIG. 17 shows a MAC CE of TYPE-1 for activating multiple PUCCH spatial relations, according to an example implementation of the present application.

FIG. 17 shows a MAC CE 1700 of TYPE-1 for activating multiple PUCCH spatial relations, according to an example implementation of the present application. In this implementation, the first field (for indicating at least one PUCCH spatial relation) may include at least the fields $S'_0, S'_1, \ldots, S'_7$.

Figure 18:
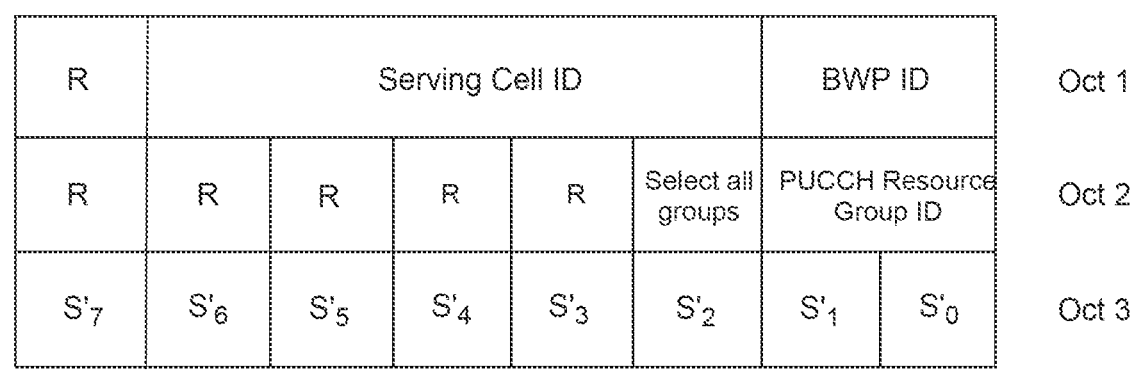
FIG. 18 shows a MAC CE of TYPE-2 for activating multiple PUCCH spatial relations, according to an example implementation of the present application.

FIG. 18 shows a MAC CE 1800 of TYPE-2 for activating multiple PUCCH spatial relations, according to an example implementation of the present application. In this implementation, the first field (for indicating at least one PUCCH spatial relation) may include at least the fields $S'_0, S'_1, \ldots, S'_7$, and the second field (for indicating multiple PUCCH resources) may include at least the field "PUCCH resource group ID."

Figure 19:
FIG. 19 shows another format of a MAC CE of TYPE-2 for activating multiple PUCCH spatial relations, according to an example implementation of the present application.

In one implementation, the PUCCH resource group ID (e.g., 2 bits) in FIG. 18 may be replaced by a bitmap (e.g., 4 bits). FIG. 19 shows another format of a MAC CE 1900 of TYPE-2 for activating multiple PUCCH spatial relations, according to an example implementation of the present application. In this implementation, the second field (for indicating multiple PUCCH resources) may include at least the fields "Group ID #1" to "Group ID #4."

In one implementation, a MAC CE may activate a new PUCCH spatial relation ID and implicitly deactivate a previous PUCCH spatial relation ID. In one implementation, a MAC CE may be used to perform either activation or deactivation, such as implementations shown in FIGS. 6-19. This approach may be useful for turning on or off a single feature. However, it may become less efficient when performing beam switching or a switch between two features. In one implementation, a MAC CE may include a pair of PUCCH spatial relation IDs. One PUCCH spatial relation ID may be for activation, and the other one may be for deactivation of the PUCCH spatial relations.

Figure 20:
FIG. 20 shows a MAC CE for simultaneously activating and deactivating PUCCH spatial relations, according to an example implementation of the present application.

Several implementations for a MAC CE to perform simultaneous PUCCH spatial relation activations/deactivations are provided in the following description. FIG. 20 shows a MAC CE 2000 for simultaneously activating and deactivating PUCCH spatial relations, according to an example implementation of the present application. The MAC CE 2000 may include three octets.

The field "activate spatial relation ID" may contain an identifier for the PUCCH spatial relation resource ID to be activated that is identified by the IE pucch-SpatialRelationInfoId. The length of this field may be 3 bits, for indicating 8 possible PUCCH spatial relations.

The field "deactivate spatial relation ID" may contain an identifier for the PUCCH spatial relation resource ID to be deactivated that is identified by the IE pucch-SpatialRelationInfoId. The length of this field may be 3 bits, for indicating 8 possible PUCCH spatial relations.

In this implementation shown in FIG. 20, the first field (for indicating at least one PUCCH spatial relation) may include at least the field "activate spatial relation ID," and the second field (for indicating multiple PUCCH resources) may include at least the field "PUCCH resource group ID." In one implementation, more than one PUCCH spatial relations may be active at the same time. The MAC CE 2000 may explicitly deactivate one of the PUCCH spatial relations that may be currently active.

Figure 21:
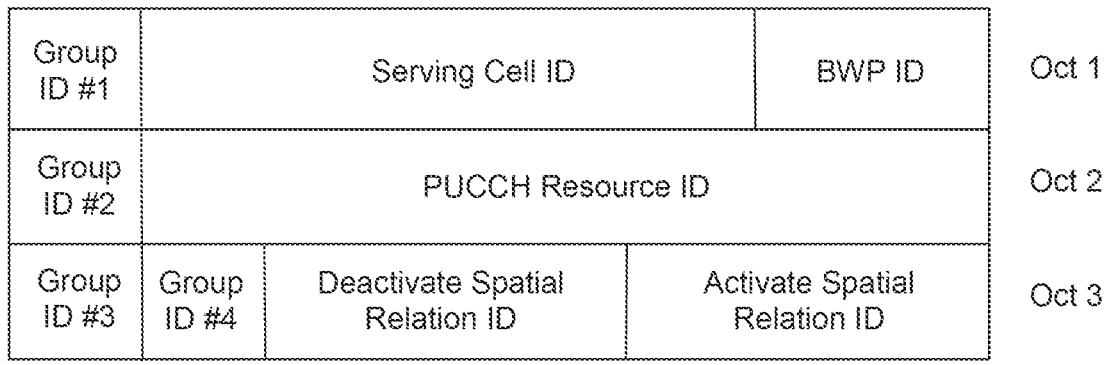
FIG. 21 shows a MAC CE for simultaneously activating and deactivating PUCCH spatial relations, the MAC CE having a bitmap for indicating a PUCCH resource group ID, according to an example implementation of the present application.

In one implementation, the PUCCH resource group ID (e.g., 2 bits) in FIG. 20 may be replaced by a bitmap (e.g., 4 bits). FIG. 21 shows a MAC CE 2100 for simultaneously activating and deactivating PUCCH spatial relations, the MAC CE having a bitmap for indicating a PUCCH resource group ID, according to an example implementation of the present application. In this implementation, the second field (for indicating multiple PUCCH resources) may include at least the fields "Group ID #1" to "Group ID #4."

Figure 22:
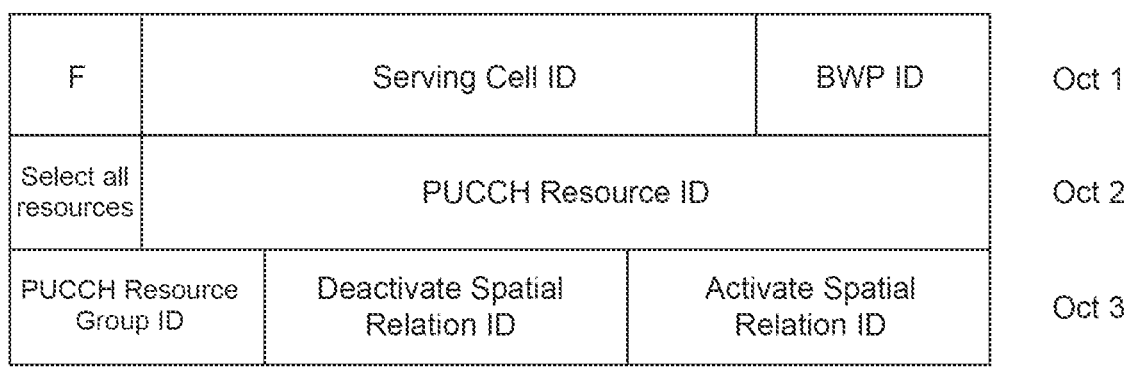
FIG. 22 shows a MAC CE for simultaneously activating and deactivating PUCCH spatial relations, the MAC CE having a field for indicating whether a group-based indication is used, according to an example implementation of the present application.

FIG. 22 shows a MAC CE 2200 for simultaneously activating and deactivating PUCCH spatial relations, the MAC CE having a field for indicating whether a group-based indication is used, according to an example implementation of the present application. In this implementation, the first field (for indicating at least one PUCCH spatial relation) may include at least the field "activate spatial relation ID," and the second field (for indicating multiple PUCCH resources) may include at least the field "PUCCH resource group ID." The MAC CE 2200 may include a field "F," which may indicate that the PUCCH spatial relation (e.g., indicated by the field "activate spatial relation ID") is activated whether for the single PUCCH resource indicated by the field "PUCCH resource ID" or multiple PUCCH resources indicated by the field "PUCCH resource group ID."

In one implementation, there may be no need to support resource-based beam indication. A MAC CE for activating a PUCCH spatial relation may include no particular PUCCH resource ID.

FIG. 23 shows a MAC CE 2300 without a particular PUCCH resource ID, according to an example implementation of the present application. In this implementation, the first field (for indicating at least one PUCCH spatial relation) may include at least the fields $S_0, S_1, \ldots, S_7$, and the second field (for indicating multiple PUCCH resources) may include at least the field "PUCCH resource group ID."

In one implementation, the PUCCH resource group ID (e.g., 2 bits) in FIG. 23 may be replaced by a bitmap (e.g., 4 bits). FIG. 24 shows another format of a MAC CE 2400 without a particular PUCCH resource ID, according to an example implementation of the present application. In this implementation, the second field (for indicating multiple PUCCH resources) may include at least the fields "Group ID #1" to "Group ID #4."

In one implementation, if there is a configured PUCCH resource ID that does not belong to any PUCCH resource group (e.g., PUCCH resource #1 451 shown in FIG. 4), a UE may use the same indicated beam as the first PUCCH resource group (e.g., resource group #1 441 in FIG. 4) for that PUCCH resource ID. If there is no configured beam on the first PUCCH resource group, the UE may use a default PUCCH beam in one implementation.

Figure 25:
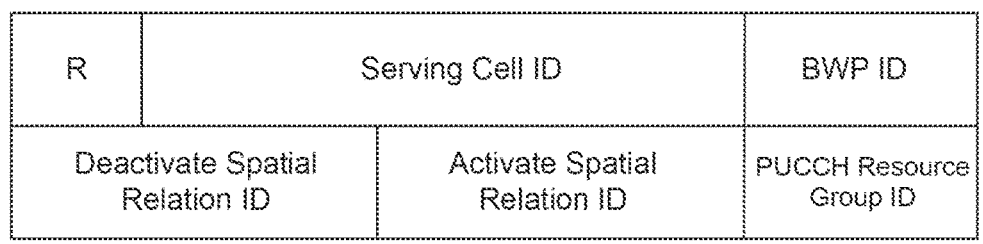
FIG. 25 shows a MAC CE for simultaneously activating and deactivating PUCCH spatial relations, the MAC CE having no particular PUCCH resource ID, according to an example implementation of the present application.

Several implementations of a MAC CE that requires only two octets are provided in the following description. FIG. 25 shows a MAC CE 2500 for simultaneously activating and deactivating PUCCH spatial relations, the MAC CE having no particular PUCCH resource ID, according to an example implementation of the present application. The MAC CE 2500 may include the fields "activate spatial relation ID" and "deactivate spatial relation ID," which are similar to the implementation shown in FIG. 20. In this implementation shown in FIG. 25, the first field (for indicating at least one PUCCH spatial relation) may include at least the field "activate spatial relation ID," and the second field (for indicating multiple PUCCH resources) may include at least the field "PUCCH resource group ID."

Figure 26:
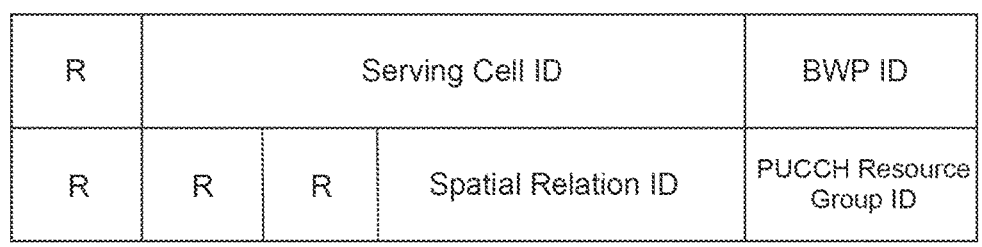
FIG. 26 shows a MAC CE for a group-based beam indication, the MAC CE having no particular PUCCH resource ID, according to an example implementation of the present application.

FIG. 26 shows a MAC CE 2600 for a group-based beam indication, the MAC CE having no particular PUCCH resource ID, according to an example implementation of the present application. In this implementation, the first field (for indicating at least one PUCCH spatial relation) may include at least the field "spatial relation ID," and the second field (for indicating multiple PUCCH resources) may include at least the field "PUCCH resource group ID."

Figure 27:
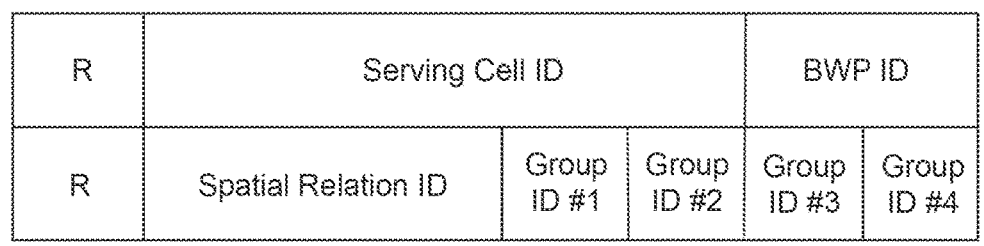
FIG. 27 shows another format of a MAC CE for a group-based beam indication, the MAC CE having no particular PUCCH resource ID, according to an example implementation of the present application.

In one implementation, the PUCCH resource group ID (e.g., 2 bits) in FIG. 26 may be replaced by a bitmap (e.g., 4 bits). FIG. 27 shows another format of a MAC CE 2700 for a group-based beam indication, the MAC CE having no particular PUCCH resource ID, according to an example implementation of the present application. In this implementation, the second field (for indicating multiple PUCCH resources) may include at least the fields "Group ID #1" to "Group ID #4."

Figure 28:
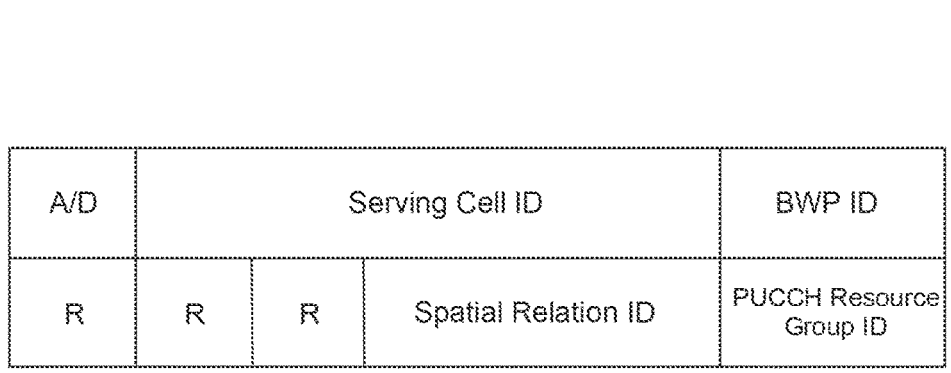
FIG. 28 shows a MAC CE that includes a field for indicating activation or deactivation of PUCCH spatial relations, the MAC CE having no particular PUCCH resource ID, according to an example implementation of the present application.

FIG. 28 shows a MAC CE 2800 that includes a field for indicating activation or deactivation of PUCCH spatial relations, the MAC CE having no particular PUCCH resource ID, according to an example implementation of the present application. The MAC CE 2800 may include a field "A/D." The field "A/D" may indicate whether the MAC CE 2800 is used to activate or deactivate the indicated resource group. For example, the field "A/D" may be set to 1 to indicate activation and set to 0 to indicate deactivation. In this implementation shown in FIG. 28, the first field (for indicating at least one PUCCH spatial relation) may include at least the field "spatial relation ID," and the second field (for indicating multiple PUCCH resources) may include at least the field "PUCCH resource group ID."

Figure 29:
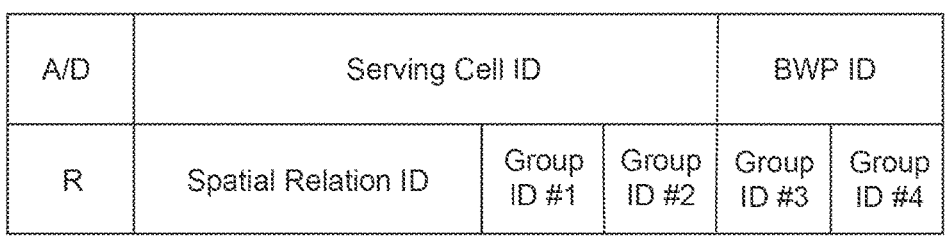
FIG. 29 shows another format of a MAC CE that includes a field for indicating activation or deactivation of PUCCH spatial relations, the MAC CE having no particular PUCCH resource ID, according to an example implementation of the present application.

In one implementation, the PUCCH resource group ID (e.g., 2 bits) in FIG. 28 may be replaced by a bitmap (e.g., 4 bits). FIG. 29 shows another format of a MAC CE 2900 that includes a field for indicating activation or deactivation of PUCCH spatial relations, the MAC CE having no particular PUCCH resource ID, according to an example implementation of the present application. In this implementation, the second field (for indicating multiple PUCCH resources) may include at least the fields "Group ID #1" to "Group ID #4."

Figure 30:
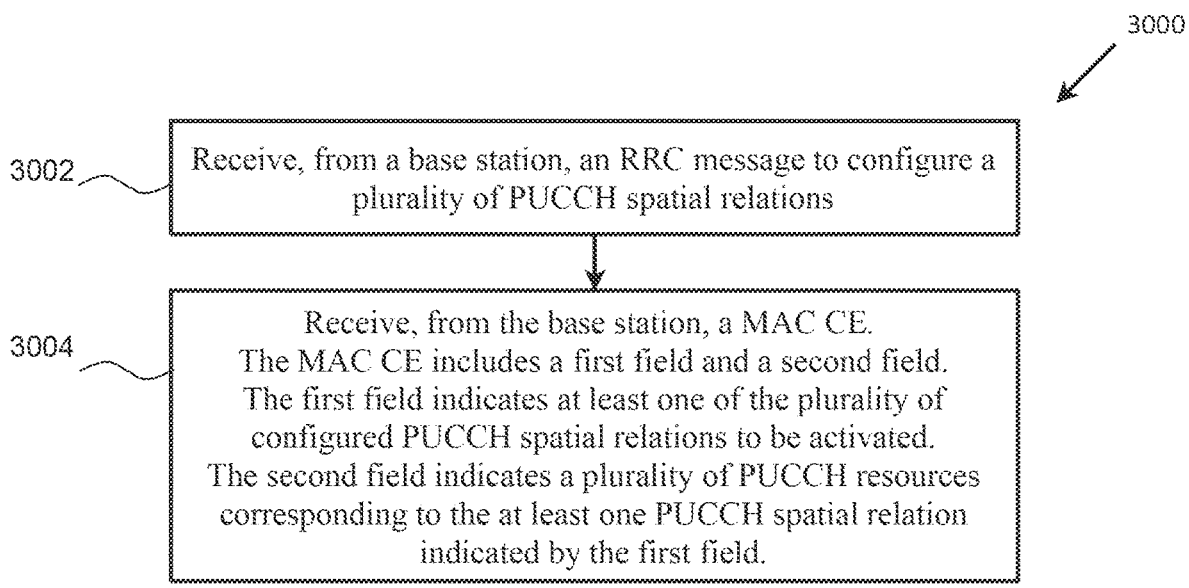
FIG. 30 is a flowchart for a method of activating a PUCCH spatial relation performed by a UE, according to an example implementation of the present application.

FIG. 30 is a flowchart for a method of activating a PUCCH spatial relation performed by a UE, according to an example implementation of the present application. The method 3000 may include actions 3002 and 3004. In action 3002, the UE may receive, from a base station, an RRC message to configure a plurality of PUCCH spatial relations. Action 3002 may be similar to actions 131, 141, 151 shown in FIGS. 1-3. In action 3004, the UE may receive, from the base station, a MAC CE. The MAC CE may include a first field and a second field. The first field may indicate at least one of the plurality of configured PUCCH spatial relations to be activated. The second field may indicate a plurality of PUCCH resources corresponding to the at least one PUCCH spatial relation indicated by the first field. Several implementations of the MAC CE in action 3004 may be seen in FIGS. 5-29.

Figure 31:
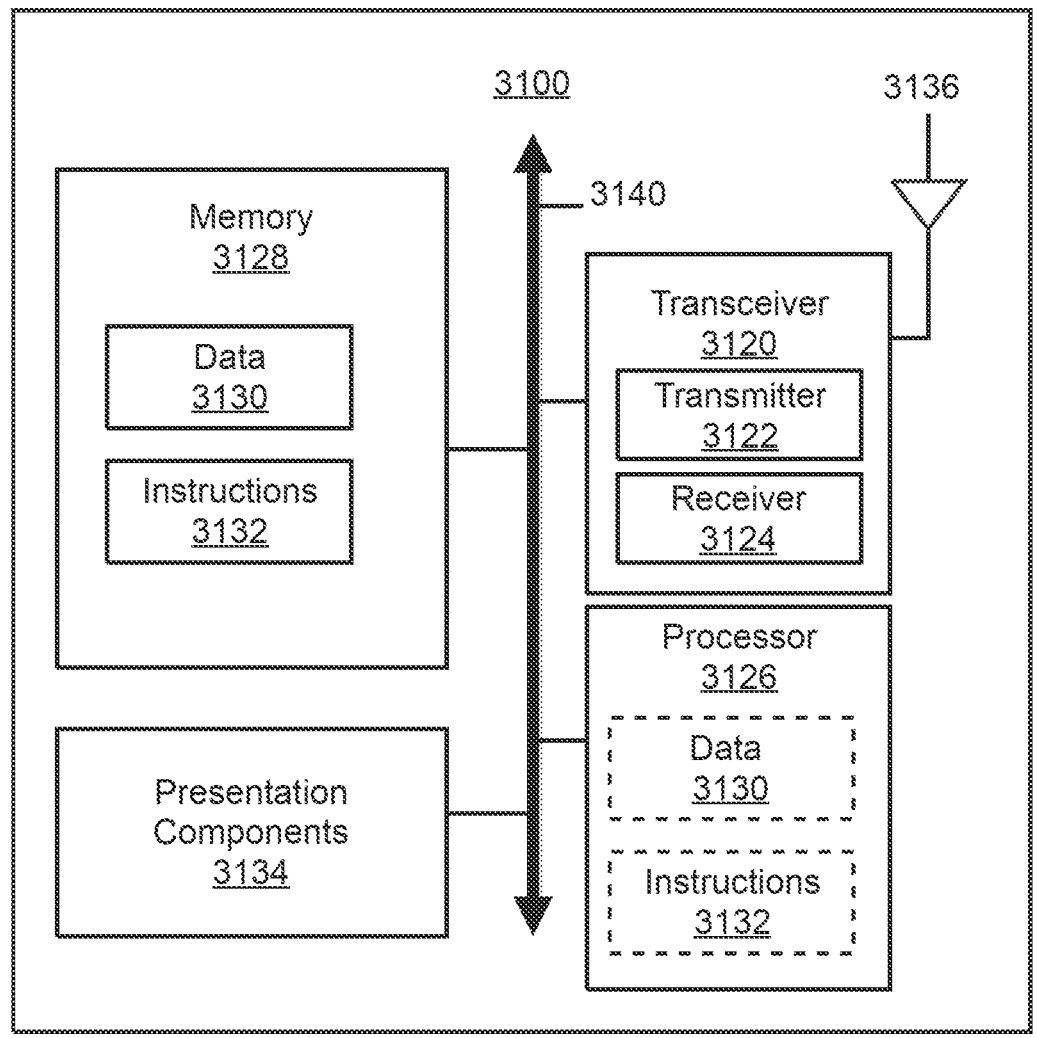
FIG. 31 illustrates a block diagram of a device for wireless communication, in accordance with various aspects of the present application.

FIG. 31 illustrates a block diagram of a device 3100 for wireless communication, in accordance with various aspects of the present application. As shown in FIG. 31, device 3100 may include transceiver 3120, processor 3126, memory 3128, one or more presentation components 3134, and at least one antenna 3136. Device 3100 may also include a Radio Frequency (RF) spectrum band module, a base station communications module, a network communications module, and a system communications management module, input/output (I/O) ports, I/O components, and power supply (not explicitly shown in FIG. 31). Each of these components may be in communication with each other, directly or indirectly, over one or more buses 3140.

Transceiver 3120 having transmitter 3122 and receiver 3124 may be configured to transmit and/or receive time and/or frequency resource partitioning information. In some implementations, transceiver 3120 may be configured to transmit in different types of subframes and slots including, but not limited to, usable, non-usable and flexibly usable subframes and slot formats. Transceiver 3120 may be configured to receive data and control channels.

Device 3100 may include a variety of computer-readable media. Computer-readable media can be any available media that can be accessed by device 3100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 3128 may include computer-storage media in the form of volatile and/or non-volatile memory. Memory 3128 may be removable, non-removable, or a combination thereof. Example memory includes solid-state memory, hard drives, optical-disc drives, and etc. As illustrated in FIG. 31, memory 3128 may store computer-readable, computer-executable instructions 3132 (e.g., software codes) that are configured to, when executed, cause processor 3126 to perform various functions described herein, for example, with reference to a process shown in FIGS. 1-3, and with reference to a MAC CE shown in FIGS. 5-29. Alternatively, instructions 3132 may not be directly executable by processor 3126 but be configured to cause device 3100 (e.g., when compiled and executed) to perform various functions described herein.

Processor 3126 may include an intelligent hardware device, e.g., a central processing unit (CPU), a microcontroller, an ASIC, and etc. Processor 3126 may include memory. Processor 3126 may process data 3130 and instructions 3132 received from memory 3128, and information through transceiver 3120, the base band communications module, and/or the network communications module. Processor 3126 may also process information to be sent to transceiver 3120 for transmission through antenna 3136, to the network communications module for transmission to a core network.

One or more presentation components 3134 presents data indications to a person or other device. Exemplary one or more presentation components 3134 include a display device, speaker, printing component, vibrating component, and etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE), comprising:
at least one processor; and
at least one memory coupled to the at least one processor and storing computer-executable instructions that when executed by the at least one processor, cause the UE to:
receive, from a base station (BS), a medium access control (MAC) control element (CE) comprising at least a first field and a second field, the first field indicating an identifier (ID) of a specific physical uplink control channel (PUCCH) spatial relation to be activated or deactivated, and the second field indicating an ID of a specific PUCCH resource;
apply the MAC CE to all PUCCH resources in a specific PUCCH group that includes the specific PUCCH resource in a case that the MAC CE is identified by a first logical channel ID (LCID); and
apply the MAC CE to the specific PUCCH resource in a case that the MAC CE is identified by a second LCID.

2. The UE of claim 1, wherein the computer-executable instructions, when executed by the at least one processor, further cause the processor UE to:
receive, from the BS, a radio resource control (RRC) message to configure a plurality of PUCCH groups, each of the plurality of PUCCH groups including a plurality of PUCCH resources.

3. The UE of claim 2, wherein the MAC CE does not include an ID of any of the configured plurality of PUCCH groups.

4. The UE of claim 1, wherein the computer-executable instructions, when executed by the at least one processor, further cause the UE to:
receive, from the BS, a radio resource control (RRC) message to configure a plurality of PUCCH spatial relations.

5. The UE of claim 4, wherein the computer-executable instructions, when executed by the at least one processor, further cause the UE to:
obtain an updated list of the configured plurality of PUCCH spatial relations by merging PUCCH spatial relations that correspond to a same receiving beam; and
transmit the updated list to the BS.

6. The UE of claim 4, wherein the computer-executable instructions, when executed by the at least one processor, further cause the UE to:
transmit, to the BS, information related to a receiving beam that corresponds to each of the configured plurality of PUCCH spatial relations.

7. The UE of claim 1, wherein the first field is a bitmap corresponding to the specific PUCCH spatial relation.

8. The UE of claim 1, wherein the MAC CE further comprises a third field indicating whether the specific PUCCH spatial relation is activated for all PUCCH resources configured by the BS.

9. The UE of claim 1, wherein the MAC CE further comprises:
   a third field indicating an identity of a single PUCCH resource; and
   a fourth field indicating that the specific PUCCH spatial relation is activated for the single PUCCH resource or for the specific PUCCH resource.

10. The UE of claim 1, wherein the MAC CE further comprises a third field indicating that the specific PUCCH spatial relation is to be deactivated.

11. A method performed by a user equipment (UE) for activating a physical uplink control channel (PUCCH) spatial relation, the method comprising:
   receiving, from a base station (BS), a medium access control (MAC) control element (CE) comprising at least a first field and a second field, the first field indicating an identifier (ID) of a specific PUCCH spatial relation to be activated or deactivated, and the second field indicating an ID of a specific PUCCH resource;
   applying the MAC CE to all PUCCH resources in a specific PUCCH group that includes the specific PUCCH resource in a case that the MAC CE is identified by a first logical channel ID (LCID); and
   applying the MAC CE to the specific PUCCH resource in a case that the MAC CE is identified by a second LCID.

12. The method of claim 11, further comprising:
   receiving, from the BS, a radio resource control (RRC) message to configure a plurality of PUCCH groups, each of the plurality of PUCCH groups including a plurality of PUCCH resources.

13. The method of claim 12, wherein the MAC CE does not include an ID of any of the configured plurality of PUCCH groups.

14. The method of claim 11, further comprising:
   receiving, from the BS, a radio resource control (RRC) message to configure a plurality of PUCCH spatial relations.

15. The method of claim 14, further comprising:
   obtaining an updated list of the configured plurality of PUCCH spatial relations by merging PUCCH spatial relations that correspond to a same receiving beam; and
   transmitting the updated list to the BS.

16. The method of claim 14, further comprising:
   transmitting, to the BS, information related to a receiving beam that corresponds to each of the configured plurality of PUCCH spatial relations.

17. The method of claim 11, wherein the first field is a bitmap corresponding to the specific PUCCH spatial relation.

18. The method of claim 11, wherein the MAC CE further comprises a third field indicating whether the specific PUCCH spatial relation is activated for all PUCCH resources configured by the BS.

19. The method of claim 11, wherein the MAC CE further comprises:
   a third field indicating an identity of a single PUCCH resource; and
   a fourth field indicating that the specific PUCCH spatial relation is activated for the single PUCCH resource or for the specific PUCCH resource.

20. The method of claim 11, wherein the MAC CE further comprises a third field indicating that the specific PUCCH spatial relation is to be deactivated.

* * * * *